US008042398B2

(12) United States Patent
Nagahara et al.

(10) Patent No.: US 8,042,398 B2
(45) Date of Patent: Oct. 25, 2011

(54) ULTRASONIC RECEIVER

(75) Inventors: Hidetomo Nagahara, Kyoto (JP); Takehiko Suginouchi, Kanagawa (JP); Masahiko Hashimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 449 days.

(21) Appl. No.: 12/439,690

(22) PCT Filed: May 28, 2008

(86) PCT No.: PCT/JP2008/060256

§ 371 (c)(1), (2), (4) Date: Mar. 3, 2009

(87) PCT Pub. No.: WO2008/149879

PCT Pub. Date: Dec. 11, 2008

(65) Prior Publication Data

US 2010/0180693 A1 Jul. 22, 2010

(30) Foreign Application Priority Data

May 30, 2007 (JP) ................................ 2007-144101

(51) Int. Cl.
*G01B 17/00* (2006.01)

(52) U.S. Cl. .............................. 73/617; 73/584; 73/634

(58) Field of Classification Search .................... 73/617, 73/584, 644, 632

See application file for complete search history.

(56) References Cited

U.S. PATENT DOCUMENTS 4,442,512 A * 4/1984 Kodera et al. ................... 367/87

(Continued)

FOREIGN PATENT DOCUMENTS

EP 1 610 587 12/2005

(Continued)

OTHER PUBLICATIONS

International Search Report for corresponding Application No. PCT/JP2008/060256 mailed Sep. 18, 2008.

(Continued)

*Primary Examiner* — Lisa Caputo
*Assistant Examiner* — Jamel Williams
(74) *Attorney, Agent, or Firm* — Renner, Otto, Boisselle & Sklar, LLP

(57) ABSTRACT

An ultrasonic receiver according to the present invention includes: a wave propagating portion 6, which defines a first opening 63 and a waveguide 60 that makes an ultrasonic wave, coming through the first opening 63, propagate in a predetermined direction; and a propagation medium portion 3, which has a transmissive interface 61 and which is arranged with respect to the waveguide 60 such that the transmissive interface 61 defines one surface of the waveguide 60 in the direction in which the ultrasonic wave propagates. The interface 61 is designed and arranged with respect to the waveguide 60 such that as the ultrasonic wave propagates along the waveguide 60, each portion of the ultrasonic wave is transmitted into the propagation medium portion 3 through the interface 61 and then converged toward a predetermined convergence point. The receiver further includes a sensor portion 2, which is arranged at the convergence point 33 to detect the ultrasonic wave converged. The propagation medium portion includes a propagation medium that fills a space between the interface and the convergence point. The waveguide is filled with an environmental fluid and acoustic velocities $C_n$ and $C_a$ of the ultrasonic wave propagating through the propagation medium portion 3 and the environmental fluid 4, respectively, satisfy $C_n/C_a<1$. If a distance from the first opening of the waveguide to a point P, which is set at an arbitrary location on the transmissive interface, is $L_a$ as measured in the ultrasonic wave propagating direction and if a distance from the point P to the convergence point is $L_n$, then $L_a/C_a+L_n/C_n$ is always constant irrespective of where the point P is located.

14 Claims, 10 Drawing Sheets

U.S. PATENT DOCUMENTS

| | | | | |
|---|---|---|---|---|
| 4,943,129 | A | 7/1990 | Takeda et al. | |
| 6,539,812 | B1 | 4/2003 | Bergamini | |
| 7,162,930 | B2 * | 1/2007 | Hashimoto et al. | 73/861.25 |
| 7,565,842 | B2 * | 7/2009 | Nagahara et al. | 73/617 |
| 7,755,519 | B2 * | 7/2010 | Bonutti | 340/999 |
| 2005/0139013 | A1 | 6/2005 | Hashimoto et al. | |
| 2011/0123199 | A1 * | 5/2011 | Hashimoto et al. | 398/134 |
| 2011/0153282 | A1 * | 6/2011 | Zander et al. | 703/1 |

FOREIGN PATENT DOCUMENTS

| | | |
|---|---|---|
| GB | 2 127 657 | 9/1983 |
| WO | 2004/098234 | 11/2004 |

OTHER PUBLICATIONS

Form PCT/ISA/237.

* cited by examiner (a)

(b)

ULTRASONIC RECEIVER

TECHNICAL FIELD

The present invention relates to an ultrasonic receiver for receiving or detecting ultrasonic waves.

BACKGROUND ART

An ultrasonic wave propagates through a solid and various other media, and therefore, has been used in a wide variety of fields including measurement, evaluation of physical properties, engineering, medicine and biology.

The propagability of an ultrasonic wave through a medium is represented as acoustic impedance. Generally speaking, at an interface between two types of media with significantly different acoustic impedances (such as a gas and a solid), most of the ultrasonic wave that has been propagated through one of those two media will be reflected, and the ultrasonic wave cannot be transmitted to the other medium with high efficiency.

An ultrasonic vibrator is used extensively to detect an ultrasonic wave and is often made of a piezoelectric body such as a ceramic. That is why if an ultrasonic wave that has been propagated through a gas needs to be detected by an ultrasonic vibrator, most of the ultrasonic wave propagated is reflected from the surface of the ultrasonic vibrator and only a portion of that ultrasonic wave is detected by the ultrasonic vibrator. For that reason, it is usually difficult to detect an ultrasonic wave with high sensitivity. In transmitting an ultrasonic wave from an ultrasonic vibrator into the air, the efficiency will also decrease due to the reflection. That is why particularly when an ultrasonic wave is used to measure a distance or a flow rate or to sense an object, it is one of the most important problems to detect the ultrasonic wave with high sensitivity.

In order to overcome this problem, Patent Document No. 1, for example, discloses an ultrasonic transducer that can detect an ultrasonic wave, propagating through an environmental fluid such as a gas, with high sensitivity by utilizing the refraction of the ultrasonic wave and that can transmit ultrasonic waves through an environmental fluid in a broad frequency range. Hereinafter, such an ultrasonic transducer will be described.

As shown in FIG. 14, the conventional ultrasonic transducer 201 includes an ultrasonic vibrator 202 and a propagation medium 203, which is arranged on a first surface area 231 that is the transmitting, and receiving surface of the ultrasonic vibrator 202. The environment surrounding the ultrasonic transducer 201 is filled with an environmental fluid 4, through which an ultrasonic wave propagates in the direction indicated by the arrow 205 so as to reach a second surface area 232 of the propagation medium 203. An ultrasonic transducer of this type is called a “refraction propagation type ultrasonic transducer”.

As the propagation medium 203, a substance that propagates an ultrasonic wave at a lower acoustic velocity than the ultrasonic wave propagating through the environmental fluid 4 and that has a higher density than the environmental fluid 4 is selected. Patent Document No. 1 discloses a dry gel material with a silica skeleton as such a substance. The silica dry gel is a material that can have its acoustic velocity and density adjusted by modifying the conditions for the manufacturing process. For example, in the where the environmental fluid 4 is an air, the material of the propagation medium 203 may be selected such that the medium 203 has a density of 200 kg/m$^3$ and an acoustic velocity of 150 m/s.

Suppose the angle formed between the first and second surface areas 231 and 232 is identified by $\theta_1$ and the angle defined by the ultrasonic wave propagating direction 205 with respect to a normal to the second surface area 232 is identified by $\theta_2$. In that case, by choosing appropriate angles $\theta_1$ and $\theta_2$, the reflection of the ultrasonic waves from the second surface area 232 can be reduced to substantially zero. As a result, an ultrasonic transducer with high transmission and reception sensitivity is realized.

According to Patent Document No. 1, in this case, the angles $\theta_1$ and $\theta_2$ should be approximately 26 degrees and approximately 89 degrees, respectively, and the ultrasonic wave transmitted from the ultrasonic vibrator 202 goes substantially parallel to the second surface area 232. Or an ultrasonic wave that has come substantially parallel to the second surface area 232 is incident on the propagation medium 203 without being reflected from it and then detected by the ultrasonic vibrator 202. As a result, an ultrasonic wave can be introduced from a medium with extremely small acoustic impedance such as the air into a propagation medium with high efficiency or can be radiated from the propagation medium into the air with high efficiency. In this manner, ultrasonic waves can be transmitted and received with high sensitivity.

Patent Document No. 1: Pamphlet of PCT International Application Publication No. 2004/098234

DISCLOSURE OF INVENTION

Problems to be Solved by the Invention

The refraction propagation type ultrasonic transducer disclosed in Patent Document No. 1 can minimize the reflection of an ultrasonic wave from an interface between two different media and can propagate the ultrasonic wave with high efficiency. However, since the ultrasonic wave comes substantially parallel to the second surface area 232 of the propagation medium 203 that interfaces with the environmental fluid 4, the refraction propagation type ultrasonic transducer has poor reception efficiency, which is a problem.

Suppose the second surface area 232 has a width L1 as measured parallel to the paper of FIG. 15 and an ultrasonic wave 5 falling within a range with the same width L1 (=L21+L2+L22) as measured parallel to the paper of FIG. 15 is incident on the second surface area 232 such that reflection from the second surface area 232 becomes substantially equal to zero (i.e., such that $\theta_2$ becomes approximately 89 degrees) as shown in FIG. 15. In that case, portions of the ultrasonic wave 5 propagating through the sub-ranges L21 and L22 are not incident on the second surface area 232 but only the rest of the ultrasonic wave 5 propagating through the sub-range L2 is incident on the second surface area 232 and is detected by the ultrasonic vibrator 202.

L2 is calculated by L1×sin(90 degrees−$\theta_2$) and becomes approximately one-hundredth of L1. That is to say, if an ultrasonic wave is received by the method disclosed in Patent Document No. 1, the effective area becomes as small as approximately one-hundredth, and shrinks significantly, compared to a situation where the ultrasonic wave is received perpendicularly.

Also, the ultrasonic wave that has been propagated through the sub-range L2 is transmitted through the second surface area 232 and then detected by the ultrasonic vibrator 202 with a width L3. In this case, since L3>>L2, the ultrasonic wave 5 is diffused through the propagation medium 203 and then received by the ultrasonic vibrator 202. For that reason, when received by such a refraction propagation type ultrasonic transducer, the ultrasonic wave 5 has its energy density decreased.

Specifically, as the angle $\theta_1$ formed between the first and second surface areas 231 and 232 is approximately degrees, the width L3 of the first surface area 231 becomes approximately 90% (=L1×cos 20 degrees) of L1. Therefore, supposing the first and second surface areas 231 and 232 have the same length as measured perpendicularly to the paper of FIG. 15, the planar area of the first surface area 231 that is the receiving plane of the ultrasonic vibrator 202 becomes approximately 90 times (=100×0.9) as large as the area on which the ultrasonic wave is incident. As a result, the energy density of the ultrasonic wave will decrease to approximately 1/90 when it reaches the ultrasonic vibrator 202.

In order to overcome the problems described above, the present invention has an object of providing an ultrasonic receiver that can detect an incoming ultrasonic wave with high sensitivity with its reflection from an interface between two different media minimized.

Means for Solving the Problems

An ultrasonic receiver according to the present invention includes: a wave propagating portion, which defines a first opening and a waveguide that makes an ultrasonic wave, coming through the first opening, propagate in a predetermined direction; and a propagation medium portion, which has a transmissive interface and which is arranged with respect to the waveguide such that the transmissive interface defines one surface of the waveguide in the direction in which the ultrasonic wave propagates. The transmissive interface is designed and arranged with respect to the waveguide such that as the ultrasonic wave propagates along the waveguide, each portion of the ultrasonic wave is transmitted into the propagation medium portion through the transmissive interface and then converged toward a predetermined convergence point. The receiver further includes a sensor portion, which is arranged at the convergence point to detect the ultrasonic wave converged. The propagation medium portion includes a propagation medium that fills a space between the transmissive interface and the convergence point. The waveguide is filled with an environmental fluid and acoustic velocities $C_n$ and $C_a$ of the ultrasonic wave propagating through the propagation medium and the environmental fluid, respectively, satisfy $$\frac{C_n}{C_a} < 1.$$

Supposing a distance from the first opening of the waveguide to a point P, which is set at an arbitrary location on the transmissive interface, is $L_a$ as measured in the ultrasonic wave propagating direction and a distance from the point P to the convergence point is $L_n$, $L_a/C_a+L_n/C_n$ is always constant irrespective of where the point P is located.

In one preferred embodiment, the densities $\rho_n$ and $\rho_a$ of the propagation medium and the environmental fluid satisfy $$\frac{\rho_a}{\rho_n} < \frac{C_n}{C_a} < 1.$$

In another preferred embodiment, the transmissive interface is curved.

In still another preferred embodiment, the sensor portion includes an ultrasonic vibrator with a curved receiving surface.

In this particular preferred embodiment, the width of the waveguide is a half or less of the wavelength of the ultrasonic wave.

In a specific preferred embodiment, as viewed on planes that are defined perpendicularly to the ultrasonic wave propagating direction, the waveguide has cross-sectional areas that decrease in the ultrasonic wave propagating direction.

In a more specific preferred embodiment, the waveguide has an open end.

In this particular preferred embodiment, the ultrasonic receiver further includes an acoustic impedance transducer portion that has gradually varying acoustic impedances and that is arranged at the end of the waveguide.

In still another preferred embodiment, the propagation medium is a dry gel made of an inorganic oxide or an organic polymer.

In this particular preferred embodiment, the dry gel has a hydrophobized solid skeleton.

In a specific preferred embodiment, the dry gel has a density of 100 kg/m$^3$ or more and an acoustic velocity of 300 m/s or less.

In a more specific preferred embodiment, the environmental fluid is the air.

In yet another preferred embodiment, the ultrasonic receiver further includes a converging portion that defines a second opening bigger than the first opening of the waveguide. The converging portion converges the ultrasonic wave that has come through the second opening, thereby increasing sound pressure and making the ultrasonic wave reach the first opening of the waveguide.

Another ultrasonic receiver according to the present invention includes: a wave propagating portion, which defines a first opening and which allows an ultrasonic wave, coming through the first opening, to propagate inside; and a propagation medium portion, which has a transmissive interface and which is arranged with respect to the wave propagating portion such that the transmissive interface defines one surface of the wave propagating portion in the direction in which the ultrasonic wave propagates. The transmissive interface is designed and arranged with respect to the wave propagating portion such that as the ultrasonic wave goes deeper inside the wave propagating portion, the ultrasonic wave is transmitted one wave after another into the propagation medium portion through the transmissive interface and then converged toward a predetermined convergence point. The receiver further includes a sensor portion, which is arranged at the convergence point to detect the ultrasonic wave converged. Supposing the acoustic velocities of the ultrasonic wave propagating through the propagation medium portion and the wave propagating portion are $C_n$ and $C_a$, respectively, a distance from the first opening of the waveguide to a point P, which is set at an arbitrary location on the transmissive interface, is $L_a$ as measured in the ultrasonic wave propagating direction and if a distance from the point P to the convergence point is $L_n$, $L_a/C_a+L_n/C_n$ is always constant irrespective of where the point P is located.

Effects of the Invention

According to the present invention, by refracting an incoming ultrasonic wave such that the ultrasonic wave goes through an environmental fluid and then is transmitted into a propagation medium portion, the ultrasonic wave can be transmitted through the propagation medium with high efficiency while the reflection of the ultrasonic wave from an interface between two media with mutually different acoustic impedances is minimized. Also, the propagation medium portion is preferably arranged so as to define one surface of the waveguide that is filled with an environmental fluid. And the surface shape of the propagation medium portion in contact with the waveguide is preferably determined such that, as the ultrasonic wave propagates inside the waveguide, each portion of the ultrasonic wave is transmitted into the propagation medium portion one wave after another and then converged toward a predetermined convergence point. Then the ultrasonic wave that has been transmitted one wave after another into the propagation medium portion can be converged toward the convergence point with their phases matched with each other. As a result, the ultrasonic wave can be converged by using the majority of the ultrasonic wave that has come through the opening of the waveguide, and the sound pressure of the ultrasonic wave received can be increased. Consequently, the ultrasonic wave can be detected with high sensitivity.

Other features, elements, processes, steps, characteristics and advantages of the present invention will become more apparent from the following detailed description of preferred embodiments of the present invention with reference to the attached drawings.

DESCRIPTION OF REFERENCE NUMERALS

Figure 1:
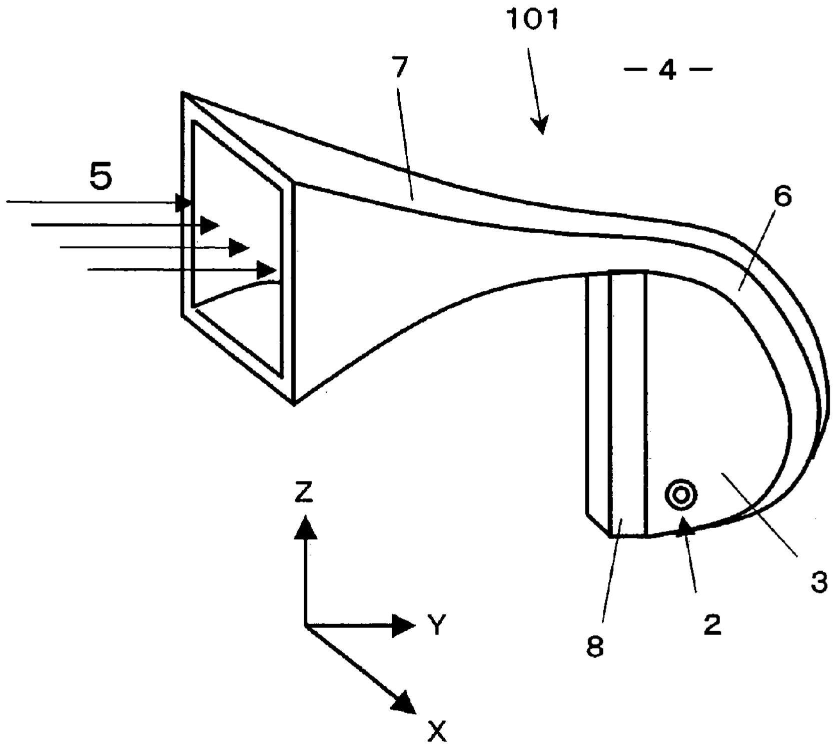
FIG. 1 is a perspective view illustrating a preferred embodiment of an ultrasonic receiver according to the present invention.

2 sensor portion
3 propagation medium portion
4 environmental fluid
5 ultrasonic wave
6 wave propagating portion
7 converging portion
8 holding portion
9 waveguide member
17 acoustic impedance transducer portion
21 piezoelectric body
22 electrode
33 convergence point
60 waveguide
61 transmissive interface
62 waveguide outer shell
63 opening
64 end
71 opening
72 end portion
231 first surface area
232 second surface area

BEST MODE FOR CARRYING OUT THE INVENTION

Hereinafter, preferred embodiments of an ultrasonic receiver according to the present invention will be described with reference to the accompanying drawings.

An ultrasonic receiver according to the present invention makes an incoming ultrasonic wave propagate from an environmental fluid with very small acoustic impedance (such as a gas) into a solid with high efficiency and then gets the ultrasonic wave, transmitted through the solid, converged inside the solid, thereby increasing the energy density of the ultrasonic wave. As a result, the receiver can receive the ultrasonic wave with high sensitivity. The present invention is preferably implemented as an ultrasonic receiver that can be used in various fields of applications. In general, however, an ultrasonic receiver also functions as a transmitter. That is why the present invention is at least applicable to an apparatus that can receive an ultrasonic wave and is preferably applied to an ultrasonic transducer that can not only receive but also transmit an ultrasonic wave.

FIG. 1 is a perspective view illustrating a preferred embodiment of an ultrasonic receiver according to the present invention. X, Y and Z directions are defined as shown in FIG. 1. The ultrasonic receiver 101 shown in FIG. 1 is used within an environmental fluid 4 such as the air so as to receive and detect an ultrasonic wave 5 propagating through the environmental fluid 4. As shown in FIG. 1, the ultrasonic receiver 101 includes a converging portion 7, a wave propagating portion 6, a propagation medium portion 3, a sensor portion 2 and a holding portion 8.

The ultrasonic wave 5, propagating through the environmental fluid 4, enters the receiver through the opening of the converging portion 7 and has its sound pressure increased by the converging portion 7. Then the ultrasonic wave 5 with the increased sound pressure is guided to the wave propagating portion 6, which makes the ultrasonic wave 5 propagate in a predetermined direction. The propagation medium portion 3 is arranged adjacent to the wave propagating portion 6. As the ultrasonic wave 5 propagates into the wave propagating portion 6, the ultrasonic wave is transmitted little by little into the propagation medium portion 3 through the interface between the wave propagating portion 6 and the propagation medium portion 3. At this time, the ultrasonic wave is refracted at the interface to have its propagating directions changed.

The ultrasonic wave 5 that has been transmitted into the propagation medium portion 3 goes through the propagation medium portion 3 so as to be converged toward the sensor portion 2, which detects the ultrasonic wave 5 that has been transmitted little by little into the propagation medium portion 3 and then converged toward itself. The holding portion 8 is provided so as to hold the propagation medium portion 3. The holding portion 8 is actually extended in the X direction to have such parts as to hide the propagation medium portion 3 in front of, and behind, the portion 3. In FIG. 1, however, those parts are omitted so as to show the propagation medium portion 3.

Figure 2:
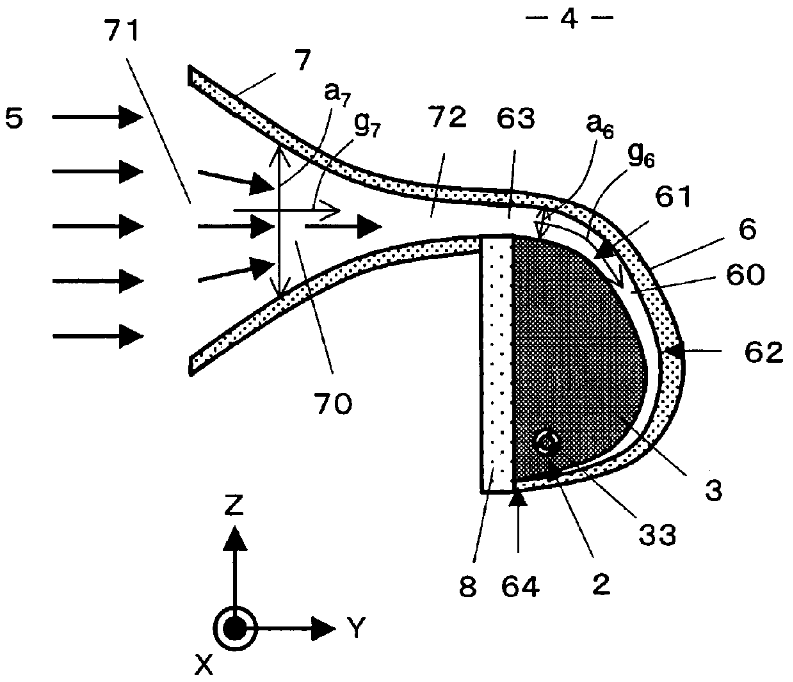
FIG. 2 is a cross-sectional view of the ultrasonic receiver shown in FIG. 1.

Hereinafter, the structures of the respective portions will be described in detail. FIG. 2 is a cross-sectional view of the ultrasonic receiver 101 shown in FIG. 1 as viewed on a plane that passes the respective centers of the converging and wave propagating portions 7 and 6 in the X direction and that is parallel to a YZ plane.

The converging portion 7 defines an inner space 70 with an end portion 72 that is connected to the opening 63 of the wave propagating portion 6 (corresponding to the "first opening" as defined by the appended claims) and another opening 71 (corresponding to the "second opening" in the claims). The opening 71 is bigger than the opening 63. The ultrasonic wave 5 that has come through the opening 71 not only has its propagating direction controlled, but also is compressed, by the inner space 70. That is why the cross-sectional area $a_7$ of the inner space 70 as measured perpendicularly to the ultrasonic wave propagating direction $g_7$ decreases in the propagating direction $g_7$ from the opening 71 toward the opening 63.

More preferably, the inner surfaces of the converging portion 7 that define the inner space 70 are curved in the propagating direction $g_7$ such that the cross-sectional area $a_7$ decreases exponentially in the propagating direction $g_7$ from the opening 71 toward the opening 63 of the wave propagating portion 6. The width of the converging portion 7 as measured in the X direction may be either constant or gradually decreasing. If the width of the converging portion 7 is constant in the X direction, then its width in the Z direction decreases exponentially in the propagating direction $g_7$. Alternatively, the cross-sectional area $a_7$ may also be decreased exponentially by reducing the widths of the converging portion 7 in both of the X and Z directions proportionally to $\sqrt{e}$ in the propagating direction $g_7$. Anyway, by decreasing the cross-sectional area $a_7$ exponentially in this manner, the ultrasonic wave 5 can be compressed and can have its sound pressure increased with its reflection by the converging portion 7 minimized and without having its phase disturbed.

The converging portion 7 may have a length of 100 mm, for example, as measured in the Y direction. The opening 71 may have a square shape with a size of 50 mm in both of the Z and X directions. The end portion 72 may also have a square shape with a size of 2 mm in both of the X and Z direction. That is to say, in this preferred embodiment, the sizes of the converging portion 7 are changed at the same rate in both of the Z and X directions. Supposing the position of the horn opening 71 is the origin (0) of the Y direction, the sizes of the inner space 70 at the respective positions where Y=0 mm, 20 mm, 40 mm, 60 mm, 80 mm and 100 mm may be 50.0 mm, 26.3 mm, 13.8 mm, 7.2 mm, 3.8 mm and 2.0 mm, respectively, as measured in the X and Z directions.

The converging portion 7 with such dimensions can increase the sound pressure by approximately 10 dB compared to a situation where no converging portion 7 is provided. Also, the shape of the sound pressure waveform, representing a variation in sound pressure with time, hardly changes, no matter whether the measurements are done at the opening 71 or at the end portion 72. Thus, the energy of the ultrasonic wave can be compressed at the end portion 72 without disturbing the ultrasonic wave 5 propagating through the environmental fluid 4.

The converging portion 7 may be formed by machining a metallic plate of aluminum, for example, with a thickness of 5 mm into a predetermined shape. Alternatively, the converging portion 7 may also be made of any material other than aluminum as long as the material hardly transmits the ultrasonic wave 5 propagating through the inner space 70 and can increase the density of the ultrasonic energy with shape effects. For example, the converging portion 7 may be made of a resin, a ceramic or any other suitable material. Also, the converging portion 7 does not have to have such a horn shape as long as the inner space 70 defines that horn shape.

The wave propagating portion 6 defines a waveguide 60 that makes the incoming ultrasonic wave 5 propagate in a predetermined direction. In this preferred embodiment, the waveguide 60 has a propagating direction $g_6$ that is curved on the ZY plane and also has varying widths on the ZY plane. The propagating direction $g_6$ is parallel to the ZY plane. The waveguide 60 has a constant width of 2 mm, for example, as measured in the X direction. However, the waveguide 60 may also be designed so as to have varying widths in the X direction, too.

The waveguide 60 has a transmissive interface 61, which is in contact with the propagation medium portion 3 and defined by the interface with the propagation medium portion 3, and a waveguide outer shell 62, which is defined by the material of the wave propagating portion 6. Also, in FIG. 2, other portions of the waveguide 60, which are located closer to, and more distant from, the person looking at the paper in the X direction, are made of the material of the wave propagating portion 6, too.

As will be described in detail later, as the ultrasonic wave 5 propagates into the waveguide 60, each portion of the ultrasonic wave 5 is transmitted into the propagation medium portion 3 through the transmissive interface 61 and the ultrasonic wave 5 propagating along the waveguide 60 loses more and more energy. That is why the cross-sectional area of the waveguide 60 is gradually decreased so as to compress the ultrasonic wave 5 with the decrease in energy compensated for. More specifically, the transmissive interface 61 and the waveguide outer shell 62 are designed so as to have their widths $a_6$ decreasing monotonically with respect to the propagating direction as measured perpendicularly to the propagating direction $g_6$ on the YZ plane. And the waveguide 60 is closed at the waveguide end portion 64. In this manner, the ultrasonic wave 5 can be refracted and transmitted efficiently into the propagation medium portion 3 with the energy density of the ultrasonic wave 5, propagating along the waveguide 60, kept constant.

As described above, the transmissive interface 61 is defined by the propagation medium portion 3 and allows the ultrasonic wave 5 to be transmitted into the propagation medium portion 3. The propagation medium portion 3 is characterized by propagating the ultrasonic wave more slowly than the environmental fluid 4 and is made of a propagation medium. That is to say, the acoustic velocities $C_n$ and $C_a$ of the ultrasonic wave propagating through the propagation medium and the environmental fluid, respectively, satisfy the following inequality:

$$\frac{C_n}{C_a} < 1 \quad (1)$$

Examples of preferred propagation media include a dry gel of an inorganic acid compound and a dry gel of an organic polymer. A silica dry gel is preferably used as a dry gel of an inorganic acid compound. A silica dry gel may be obtained by the following method, for example.

First, tetraethoxysilane (TEOS), ethanol and ammonia water are mixed together in a solution, which is then gelled into a wet gel. As used herein, the "wet gel" is obtained by filling the pores of a dry gel with some liquid. The liquid portion of that wet gel is replaced with a liquefied carbon dioxide gas and removed by a supercritical drying process using a carbon dioxide gas, thereby obtaining a silica dry gel. The density of the silica dry gel can be adjusted by changing the mixture ratios of TEOS, ethanol and ammonia water. And the acoustic velocity changes with the density.

A silica dry gel is a material defined by a fine porous structure of silicon dioxide and has a hydrophobized skeleton. The pores and the skeleton may have sizes of approximately several nanometers. If the solvent were vaporized off directly from such a structure including a liquid in its pores, great force would be produced by capillary action when the solvent vaporizes and the structure of the skeleton would collapse easily. By adopting a supercritical drying process that does not cause such surface tension as to trigger that collapse, a dry gel can be obtained without collapsing the silica skeleton.

As will be described in further detail later, the propagation medium of the propagation medium portion 3 more preferably satisfies the following inequality:

$$\frac{\rho_a}{\rho_n} < \frac{C_n}{C_a} < 1 \quad (2)$$

where $\rho_n$ and $\rho_a$ are the densities of the propagation medium and the environmental fluid, respectively.

The propagation medium of the propagation medium portion 3 more preferably has a density $\rho_n$ of 100 $kg/m^3$ or more and an acoustic velocity $C_n$ of 300 m/s or less.

The silica dry gel for use in the propagation medium portion 3 of this preferred embodiment has a density $\rho_n$ of 200 $kg/m^3$ and an acoustic velocity $C_n$ of 150 m/s. These values of this material satisfy the requirements for the refraction propagation phenomenon described in Patent Document No. 1. It should be noted that the air has a density $\rho_a$ of 1.12 $kg/m^3$ and an acoustic velocity $C_a$ of 340 m/s around room temperature.

The propagation medium portion 3 plays the role of propagating the ultrasonic wave, which has come through the environmental fluid 4, to an ultrasonic vibrator. That is why if significant internal loss were caused, the ultrasonic wave would be weakened before reaching the ultrasonic vibrator. For that reason, the propagation medium portion 3 is preferably made of a material that would not cause significant internal loss. The silica dry gel is one such material that not only satisfies requirements for the acoustic velocity and density mentioned above but also would not cause significant internal loss.

However, such a silica dry gel has a low density, and therefore, has a low mechanical strength, too. And it is difficult to handle the silica dry gel. That is why in this preferred embodiment, the holding portion 8 is provided to support the propagation medium portion 3.

Figure 3:
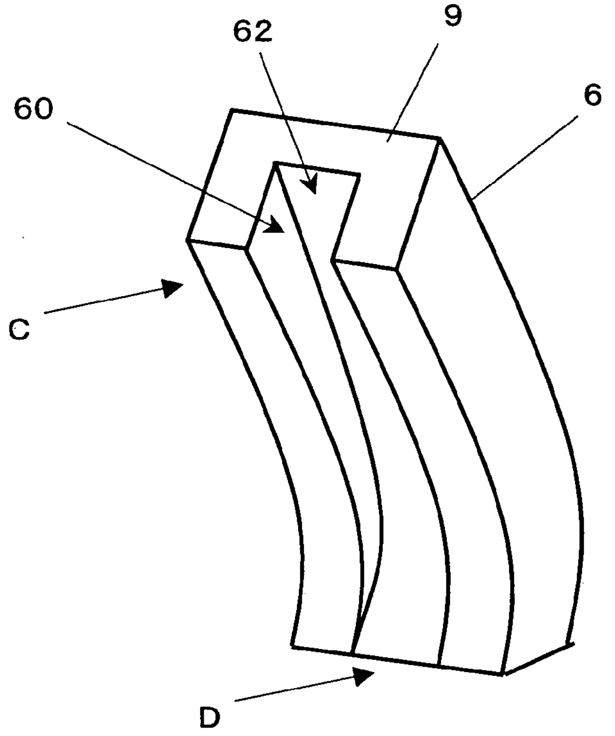
FIG. 3 is a perspective view illustrating the wave propagating portion of the ultrasonic receiver shown in FIG. 1.
Figure 4:
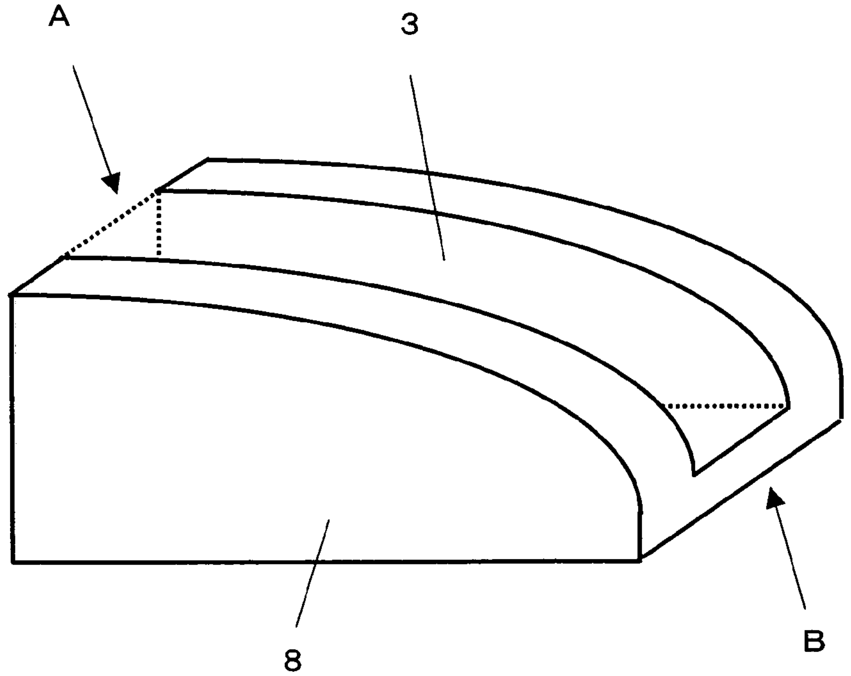
FIG. 4 is a perspective view illustrating the holding portion of the ultrasonic receiver shown in FIG. 1.

For example, the wave propagating portion 6 and the holding portion 8 may have such shapes as shown in FIGS. 3 and 4, respectively. As shown in FIG. 3, the wave propagating portion 6 is formed of, for example, an aluminum wave propagating member 9 so as to define the waveguide 60 including the waveguide outer shell 62.

Meanwhile, the holding portion 8 for holding the propagation medium portion 3 is provided as shown in FIG. 4. The exposed surface of the propagation medium portion 3, which is held by the holding portion 8, defines the transmissive interface 61. First, a holding portion 8 of a porous ceramic, for example, is formed and fitted into a mold, of which the surface to define the transmissive interface 61 is made of a fluorine resin, for example, and then a wet gel is introduced into the space. Thereafter, the liquid portion of the wet gel is replaced with liquefied carbon dioxide gas and then the gel is dried, thereby obtaining a member in which the propagation medium portion 3 and the holding portion 8 are assembled together.

By bonding the holding portion 8 and the wave propagating portion 6 together with an epoxy resin adhesive, for example, such that parts A and B of the holding portion 8 that holds the propagation medium portion 3 as shown in FIG. 4 respectively face parts C and D of the wave propagating portion 6 as shown in FIG. 3, a waveguide 60, in which the transmissive interface 61 is defined by the propagation medium portion 3, can be obtained.

Figure 5:
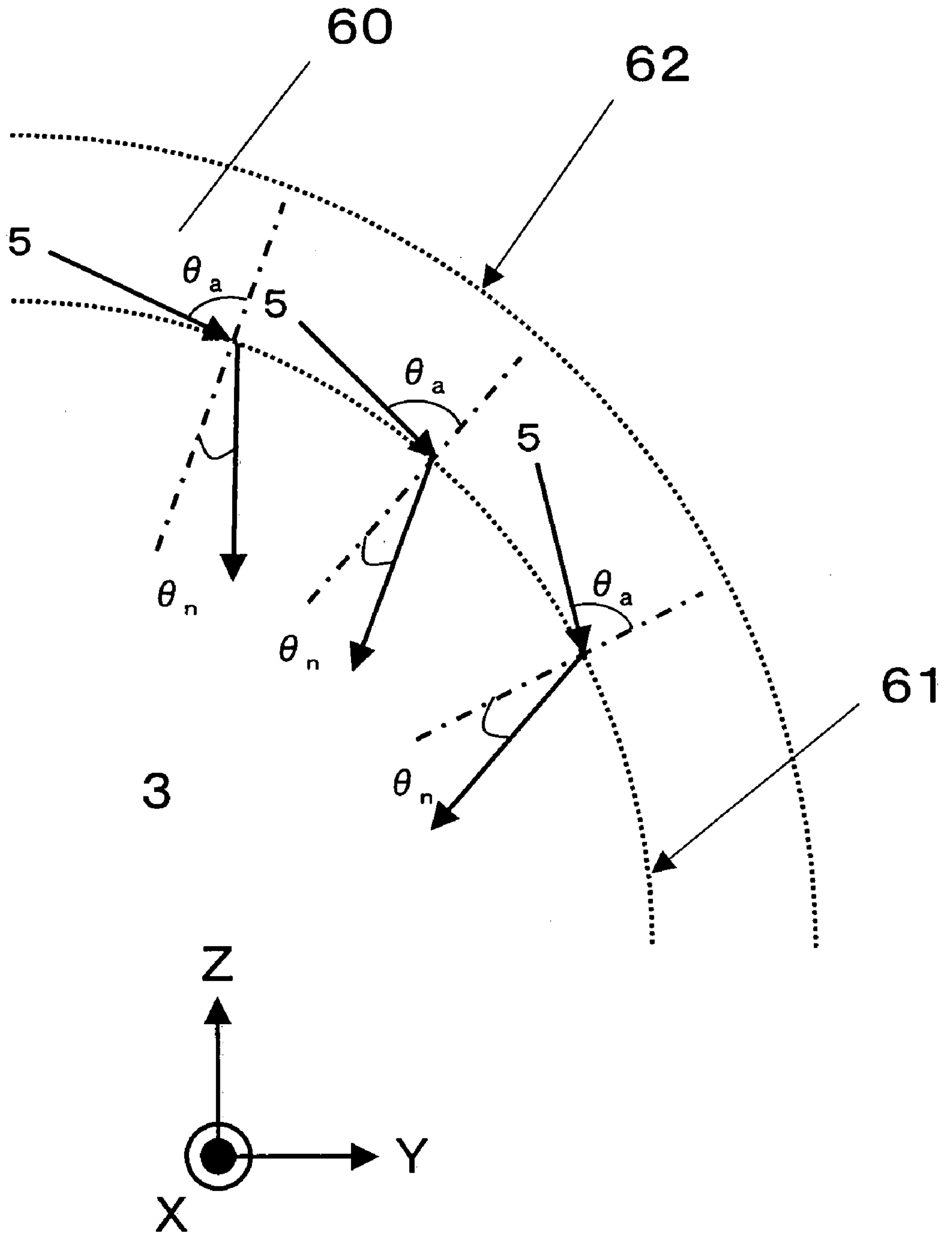
FIG. 5 illustrates how the ultrasonic wave is refracted while propagating in the ultrasonic receiver shown in FIG. 1.

Next, it will be described in detail how the geometric shapes of the waveguide 60 and the propagation medium portion 3 as defined by the wave propagating portion 6 affect the propagation of the ultrasonic wave 5. FIG. 5 illustrates a portion of the waveguide 60 on a larger scale. In FIG. 5, the transmissive interface 61 and the waveguide outer shell 62 are indicated by the dotted curves and a line that is drawn perpendicularly to a tangential line at an arbitrary point on the transmissive interface 61 is indicated by the one-dot chain. Also, the propagating directions of the ultrasonic wave 5 are indicated by the arrows.

As shown in FIG. 5, the ultrasonic wave 5, traveling inside the waveguide 60, propagates through the environmental fluid 4, with which the waveguide 60 is filled, while changing its directions according to the shape of the waveguide 60. A portion of the ultrasonic wave 5, which is going to make contact with the transmissive interface 61 that is the interface between the waveguide 60 and the propagation medium portion 3, is incident on the transmissive interface 61 so as to define an angle $\theta_a$ with respect to a normal to the transmissive interface 61 and then is refracted and transmitted into the propagation medium portion 3 so as to define at least a certain angle $\theta_n$ with respect to a normal to the transmissive interface 61 and satisfy the Snell laws of refraction.

The direction $\theta_n$ in which the ultrasonic wave propagates inside the propagation medium portion 3 is given by the following Equation (3):

$$\theta_n = \tan^{-1}\sqrt{\frac{\left(\frac{\rho_n}{\rho_a}\right)^2 - \left(\frac{C_a}{C_n}\right)^2}{\left(\frac{C_a}{C_n}\right)^2 - 1}} \quad (3)$$

where $\rho_a$ and $C_a$ are respectively the density and the acoustic velocity of the environmental fluid and $\rho_n$ and $C_n$ are respectively the density and the acoustic velocity of the propagation medium. The respective values may be as described above. If the Inequality (1) is satisfied, then $\theta_n$ calculated by Equation (3) becomes a positive value. As a result, the ultrasonic wave is refracted and transmitted into the propagation medium portion 3.

On the other hand, the reflectance R at the interface between the waveguide 60 and the propagation medium portion 3 is given by the following Equation (4):

$$R = \frac{\frac{\rho_n}{\rho_a} - \frac{\tan\theta_a}{\tan\theta_n}}{\frac{\rho_n}{\rho_a} + \frac{\tan\theta_a}{\tan\theta_n}} \tag{4}$$

To refract and transmit the ultrasonic wave from the wave propagating portion 6 into the propagation medium portion 3 with highest possible efficiency, the reflectance R is preferably as low as possible. If $C_n$, $C_a$, $\rho_n$ and $\rho_a$ satisfy Inequality (2), there must be some $\theta_a$ and $\theta_n$ that make the numerator of Equation (4) equal to zero (i.e., that will make the reflectance R equal to zero).

In this preferred embodiment, the environmental fluid 4 and the propagation medium portion 3 are the air and the silica dry gel, respectively, and $\rho_a$, $C_a$, $\rho_n$ and $C_n$ have the values described above. If these values are substituted into Equation (3), $\theta_n$ will be approximately 26 degrees. In that case, if $\theta_a$ is approximately 89 degrees, then the reflectance R will be almost equal to zero. Thus, according to the conditions of this preferred embodiment, if the ultrasonic wave is incident on the transmissive interface 61 so as to define an angle of approximately 89 degrees with respect to a normal to the transmissive interface 61, the ultrasonic wave 5 can be transmitted highly efficiently into the propagation medium portion in the direction in which $\theta_n$ is approximately equal to 26 degrees.

The angle of refraction $\theta_n$ that makes the reflectance R almost equal to zero is approximately 26 degrees, which is constant. But by curving the transmissive interface 61, ultrasonic waves that have been transmitted into the propagation medium portion 3 from multiple points on the transmissive interface 61 can be made to propagate (i.e., converged) toward a predetermined point. Also, if the waveguide 60 is bent along the transmissive interface 61, a portion of the ultrasonic wave can always be incident on the transmissive interface 61 at the constant angle $\theta_a$ as the ultrasonic wave propagates deeper into the waveguide 60. By taking advantage of this phenomenon, according to the present invention, the ultrasonic wave propagating along the waveguide is refracted and transmitted little by little into the propagation medium portion 3 and eventually converged toward a predetermined point in the propagation medium portion 3, thereby realizing high reception sensitivity.

Furthermore, the angle of refraction $\theta_n$ represented by Equation (3) and the reflectance R represented by Equation (4) do not depend on the frequency of the ultrasonic wave. For that reason, irrespective of the frequency of the ultrasonic wave to propagate, the ultrasonic wave can always be transmitted into the propagation medium portion 3 with high efficiency. As a result, the ultrasonic receiver of the present invention can detect ultrasonic waves, of which the frequencies fall within a broad frequency range, with high sensitivity.

In the field of optical lenses, Japanese Patent No. 2731389, for example, discloses a structure for converging the light that has been radiated through the side surfaces of an optical waveguide. In an optical waveguide, however, incoming light usually propagates while being reflected repeatedly from the boundary between a cladding layer and the waveguide. On the other hand, in the waveguide of this preferred embodiment, the ultrasonic wave is never reflected from the outer or side surface of the waveguide. That is why the light beams to propagate through the optical waveguide do not have matching phases, whereas it is important to make ultrasonic waves with matching phases propagate according to this preferred embodiment. Consequently, such a technique in the fields of optics is based on a quite different idea from that of the present invention.

Figure 6:
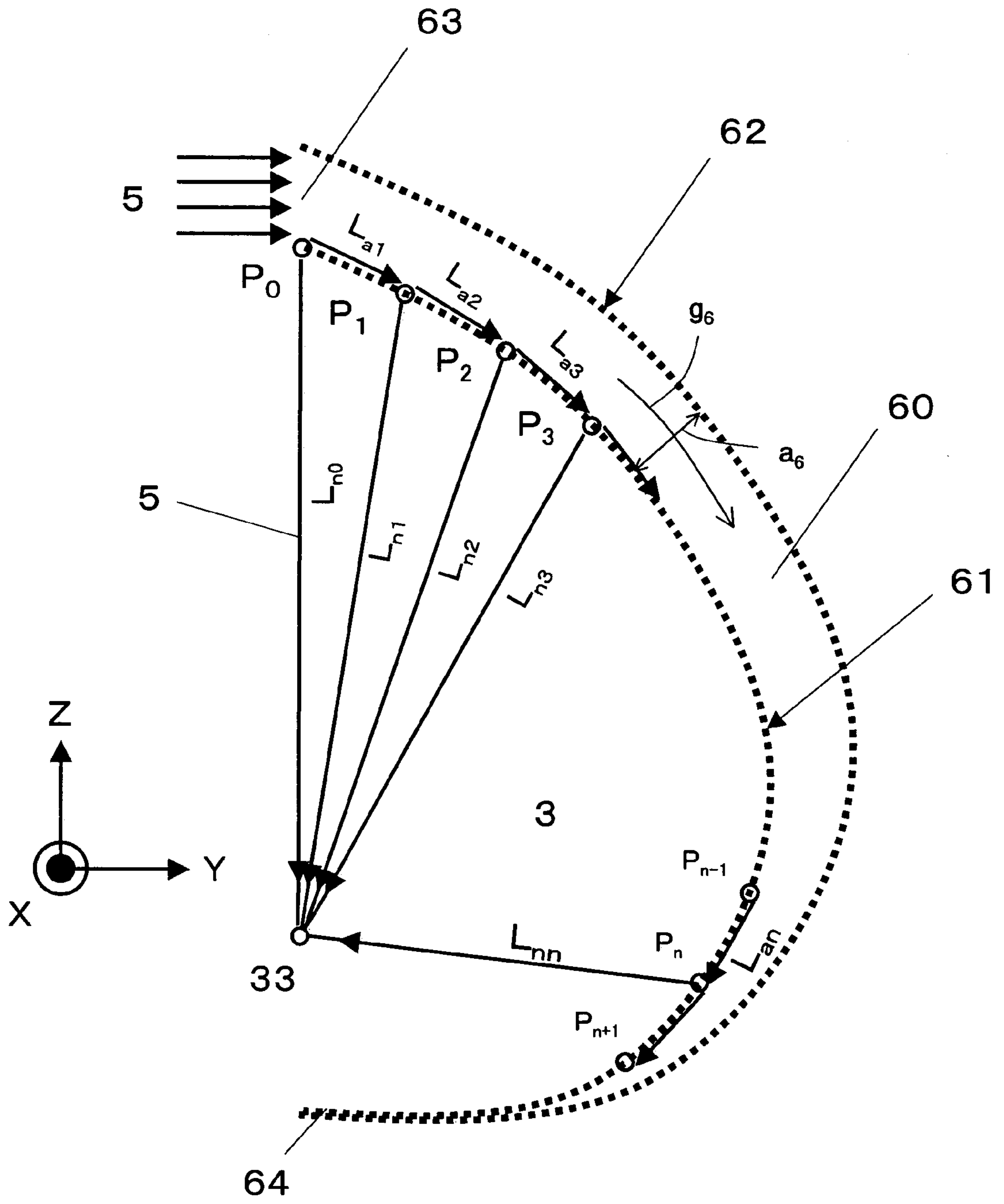
FIG. 6 illustrates how the ultrasonic wave is refracted and eventually converged while propagating in the ultrasonic receiver shown in FIG. 1.

FIG. 6 illustrates the waveguide 60 and the propagation medium portion 3 on a larger scale and shows the propagation paths of the ultrasonic waves 5 with solid arrows. In this example, the convergence point 33 where the ultrasonic waves 5 are supposed to be converged is defined within the propagation medium portion 3. At the convergence point 33, arranged is the sensor portion 2 (see FIGS. 1 and 2) to detect the ultrasonic waves as will be described later. As in FIG. 5, the transmissive interface 61 and the waveguide outer shell 62 are indicated by the dotted curves.

In FIG. 6, the point at the opening 63 of the transmissive interface 61 is identified by $P_0$ and a number of points $P_1$, $P_2$, $P_3$, . . . and $P_n$ (where n is an integer that is equal to or greater than two) are set in this order such that the point $P_1$ is the closest to the opening 63 of the transmissive interface 61. Also, the distance from the point $P_0$ to the point $P_1$ is identified by $L_{a1}$, the distance from the point $P_1$ to the point $P_2$ is identified by $L_{a2}$, and the distance from the point $P_{n-1}$ to the point $P_n$ is identified by $L_{an}$. The same labeling is adopted for the other distances, too. Furthermore, the distances from the points $P_1$, $P_2$, . . . and $P_n$ to the convergence, point 33 are identified by $L_{n1}$, $L_{n2}$, . . . and $L_{nn}$, respectively.

To converge the ultrasonic wave 5, which has come through the opening 63, propagated inside the waveguide 60 and then been refracted and transmitted into the propagation medium portion 3, toward the convergence point 33, the following Equation (5) should be satisfied:

$$\begin{aligned}\frac{L_{a1}}{C_a} + \frac{L_{n1}}{C_n} &= \frac{L_{a1} + L_{a2}}{C_a} + \frac{L_{n2}}{C_n} \\ &= \frac{L_{a1} + L_{a2} + L_{a3}}{C_a} + \frac{L_{n3}}{C_n} \\ &= \ldots = \frac{\sum_{k=1}^{n} L_{ak}}{C_a} + \frac{L_{nn}}{C_n}\end{aligned} \tag{5}$$

If the ultrasonic waves 5 are converged toward the convergence point 33 in the propagation medium portion 3, it means that the ultrasonic waves 5 have their phases matched at the convergence point 33. In other words, it means that it would take the same amount of time for any ultrasonic wave to reach the convergence point 33 from the opening 63, no matter where the ultrasonic wave passes. More specifically, in Equation (5), the left side of the leftmost equal sign represents the amount of time that it would take for the ultrasonic wave 5 to reach the convergence point 33 after having gone the distance $L_{a1}$ through the environmental fluid 4 and then the distance $L_{n1}$ through the propagation medium portion 3. On the other hand, the right side of the leftmost equal sign represents the amount of time that it would take for the ultrasonic wave 5 to reach the convergence point 33 after having gone the distance ($L_{a1}+L_{a2}$) through the environmental fluid 4 and then the distance $L_{n2}$ through the propagation medium portion 3. As for the other points $P_k$, the amount of time it would take for the ultrasonic wave to reach the convergence point 33 after having been transmitted from the waveguide 60 into the propagation medium portion 3 can be calculated in the same way.

Equation (5) can be generalized in the following manner. Specifically, if multiple points $P_1$, $P_2$, . . . and $P_n$, are set at mutually different locations on the transmissive interface 61 in the direction in which the ultrasonic wave 5 propagates from the opening 63 of the waveguide 60, if the distances from the opening 63 to those points $P_1$, $P_2$, . . . and $P_n$ along the waveguide are identified by $L_{a1}$, $L_{a2}$, . . . and $L_{an}$, respectively, and if the distances from those points $P_1$, $P_2$, . . . and $P_n$ to the convergence point 33 are identified by $L_{n1}$, $L_{n2}$, . . . and $L_{nn}$, respectively, then Equation (5) can be represented as a condition that satisfies the following Equation (6):

$$\frac{L_{ak}}{C_a}+\frac{L_{nk}}{C_n}=const. \tag{6}$$

with respect to an arbitrary k (where k is an integer that is equal to or smaller than n).

As described above, Equation (6) indicates that if the distance from the opening 63 to a point P, which is set at an arbitrary location on the transmissive interface 61, is $L_a$ as measured in the ultrasonic wave propagating direction and if the distance from the point P to the convergence point 33 is $L_n$, then $L_a/C_a+L_n/C_n$ is always constant, no matter where the point P is located. That is to say, Equation (6) indicates that it would take the same amount of time for any ultrasonic wave 5 to reach the convergence point 33 from the opening 63 by way of the point P, no matter where the point P is located. Strictly speaking, the propagation distance that the ultrasonic wave 5 needs to go along the waveguide 60 could be calculated more accurately along the centerline of the waveguide 6. As will be described later, however, the width of the waveguide 60 is much smaller than its length. That is why this approximation should be accurate enough in practice.

Next, it will be described how the transmissive interface 61 and the waveguide outer shell 62 that define the waveguide 60 should have their shapes designed. Specifically, the shapes of the transmissive interface 61 and the waveguide outer shell 62 are determined by performing the following process steps.

First of all, it is determined, based on the size of the opening 63, how long the waveguide 60 should be to introduce the ultrasonic waves 5 into the propagation medium portion 3 efficiently. Next, based on the length of the waveguide 60, an appropriate shape is selected for the transmissive interface 61 so as to converge the ultrasonic waves just as intended. Thereafter, taking the shape thus selected for the transmissive interface 61 and the width of the waveguide 60 into consideration, the shape of the transmissive interface 61 is determined finally.

The size of the opening 63 of the waveguide 60 is preferably equal to or less than a half of the wavelength of the ultrasonic waves 5 to receive. This is because if the width of the waveguide were greater than a half of the wavelength of the ultrasonic waves, then the ultrasonic waves would be reflected inside the waveguide 60 more easily to disturb the propagation of the ultrasonic waves and make it difficult to measure the ultrasonic waves accurately.

In this preferred embodiment, the ultrasonic waves to receive are supposed to have frequencies that are no higher than 80 kHz. For that reason, the size of the opening 63 is supposed to be 2.0 mm square, which is smaller than 2.1 mm that is a half wavelength at the frequency of 80 kHz. The end portion 72 of the converging portion 7 is designed so as to have the same size as the opening 63.

Figure 15:
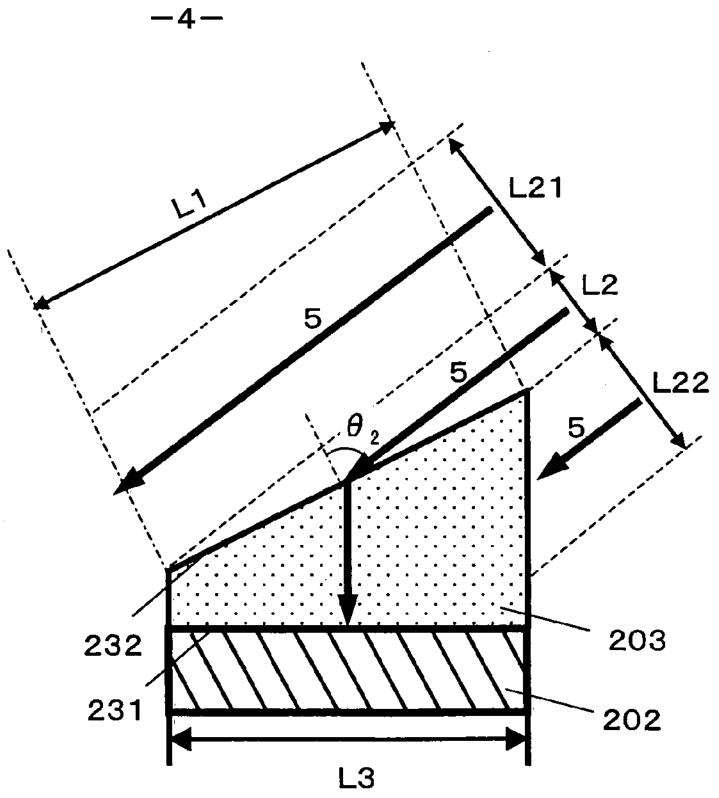
FIG. 15 is a schematic representation illustrating the wave receiving area of the ultrasonic receiver shown in FIG. 14.

The waveguide 60 is preferably long enough to refract and transmit into the propagation medium portion 3 as much of the ultrasonic waves 5 propagating through the waveguide 60 as possible. As already described with reference to FIG. 15, as for ultrasonic waves of the refraction propagation type, an ultrasonic wave that has propagated through the range $L_2$ is transmitted into the propagation medium through the surface of the propagation medium with the length $L_1$. The lengths $L_2$ and $L_1$ shown in FIG. 15 respectively correspond to the size of the opening 63 of the waveguide 60 as measured in the Z direction and the length of the transmissive interface 61 as measured on the YZ plane shown in FIG. 6. If the length of the transmissive interface 61 as measured on the YZ plane (i.e., the length of the waveguide 60 in the ultrasonic wave propagating direction $g_6$) were not sufficient, then the ultrasonic waves could not be transmitted into the propagation medium portion 3 sufficiently. In that case, the reception sensitivity would decrease and the non-received ultrasonic waves would be reflected, thus decreasing the measuring accuracy significantly.

In this preferred embodiment, the angle $\theta_a$ defined by a normal to the propagation medium portion 3 in the environmental fluid 4 with respect to the ultrasonic wave propagating direction (see FIG. 5) is approximately 89.3 degrees, and the ratio of $L_1$ to $L_2$ is approximately equal to 88. For that reason, ideally the waveguide 60 is at least approximately 90 times as long as the size of the opening 63. In this preferred embodiment, the opening 63 of the waveguide has a size of 2 mm, and the waveguide 60 has a length of 200 mm, which is 100 times as long as the size of the opening 63.

The size of the opening 63 and the length of the waveguide 60 are determined in this manner. After that, based on the length of the waveguide 60 thus determined, the shapes of the transmissive interface 61 and the waveguide outer shell are determined.

Hereinafter, it will be described with reference to FIG. 6 specifically how the waveguide 60 may be designed.

First of all, the amount of time it would take for the ultrasonic wave to reach the convergence point 33 from the point $P_0$ at the opening 63 (which will be referred to herein as a "propagation time") is calculated. The propagation time to this point will be used as a reference in the rest of the design process. At the opening 63, the amount of time in which the ultrasonic wave has propagated through the waveguide 60 that is filled with the air as an environmental fluid 4 is still zero. On entering the waveguide 60, an ultrasonic wave is transmitted into the propagation medium portion 3 immediately. Thus, the propagation time $t_{n0}$ of the ultrasonic wave at the point $P_0$ is calculated as $L_{n0}/C_n$ by dividing the distance $L_{n0}$ from the convergence point 33 to the point $P_0$ by the acoustic velocity $C_0$ of the propagation medium.

Thereafter, the next point $P_1$ to reach on the inner surface for the ultrasonic wave propagating inside the waveguide is located. First, the coordinates of the point $P_1$ that is located at a distance $\Delta L$ from the point $P_0$ are determined. $\Delta L$ will determine the resolution of the shape of the waveguide. That is to say, if an accurate shape is required, $\Delta L$ needs to be small. Actually, however, it is sufficient if $\Delta L$ is equal to or smaller than 1/100 of the length of the waveguide 60. In this preferred embodiment, ΔL is supposed to be 1 mm, which is 1/200 of the length of the waveguide 60.

In the case where the point $P_0$ is set as the coordinates (0, $L_{n0}$), the coordinates ($Y_1$, $Z_1$) of the point $P_1$ may be represented as the following Equation (7):

$$(Y_1,Z_1)=(\Delta L\cos\theta_1,L_{n0}+\Delta L\sin\theta_1) \quad (7)$$

Since ΔL=1 in this example, the coordinates ($Y_1$, $Z_1$) of the point $P_1$ may be calculated by the following Equation (8):

$$(Y_1,Z_1)=(\cos\theta_1,L_{n0}+\sin\theta_1) \quad (8)$$

where $\theta_1$ is the angle defined by the vector from the point $P_0$ to the point $P_1$ with respect to the Y-axis. In the same way, the coordinates ($Y_2$, $Z_2$) and ($Y_3$, $Z_3$) of $P_2$ and $P_3$ may be calculated by the following Equations (9) and (10), respectively:

$$(Y_2,Z_2)=(\cos\theta_1+\cos\theta_2,L_{n0}+\sin\theta_1+\sin\theta_2) \quad (9)$$

$$(Y_3,Z_3)=(\cos\theta_1+\cos\theta_2+\cos\theta_3,L_{n0}+\sin\theta_1+\sin\theta_2+\sin\theta_3) \quad (10)$$

Thus, the coordinates of the point $P_n$ can be represented by the following Equation (11):

$$(Y_n,Z_n)=\left(\sum_{k=1}^{n}\cos\theta_1,\ L_{n0}+\sum_{k=1}^{n}\sin\theta_1\right) \quad (11)$$

Figure 7:
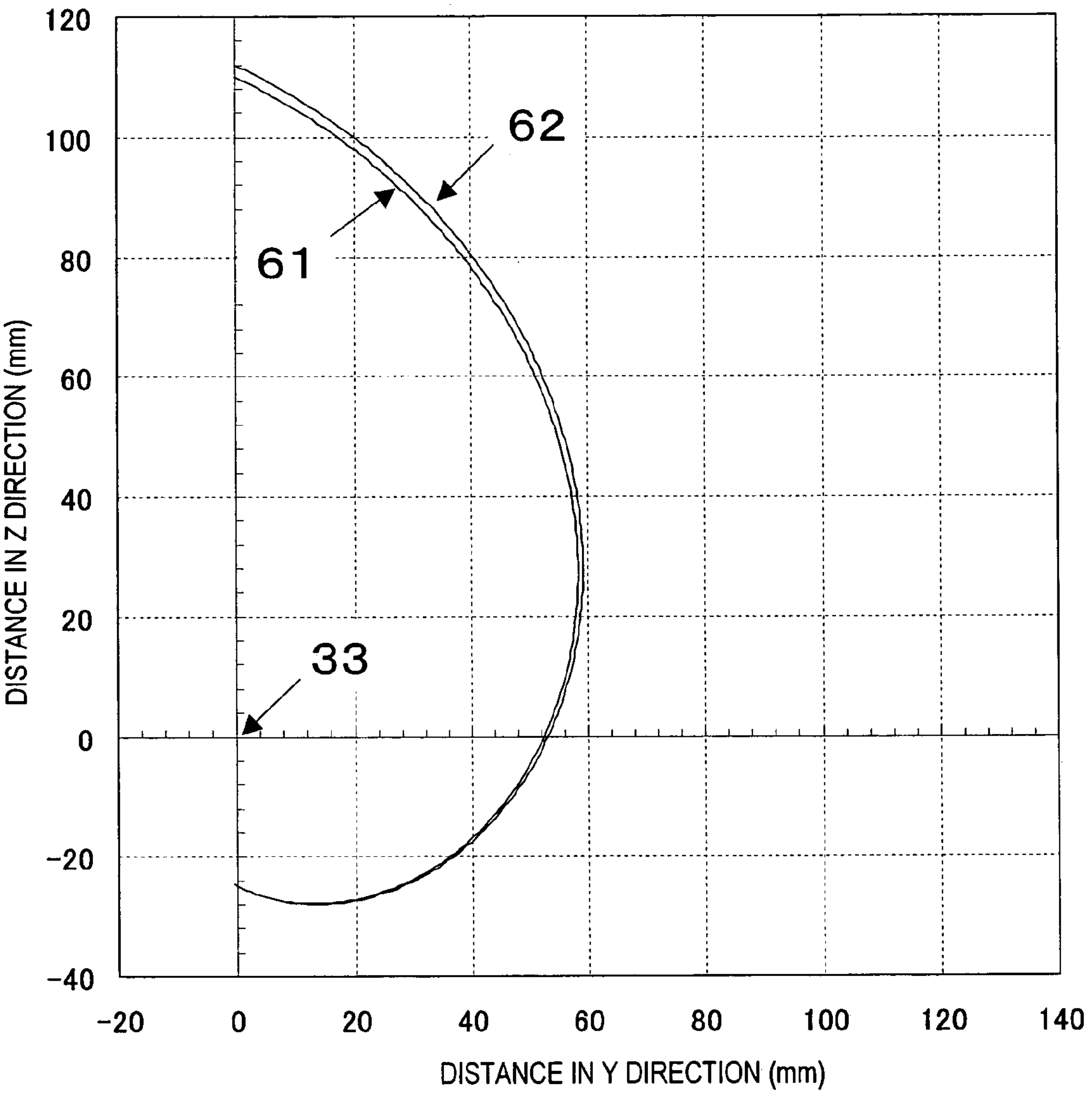
FIG. 7 shows a specific structure for the waveguide of the ultrasonic receiver shown in FIG. 1.

As described above, the transmissive interface 61 is designed such that any ultrasonic wave that has propagated from the opening 63 to the point $P_n$ and then has been transmitted into the propagation medium portion 3 at the point $P_n$ will reach the convergence point 33 in the same amount of time. FIG. 7 shows an example of the waveguide 60 designed. In FIG. 7, the convergence point 33 is defined at the origin (0, 0). The waveguide outer shell 62 is designed so as to be located at a distance of 2 mm from the transmissive interface 61 at the opening 63 but have its width (i.e., distance from the transmissive interface 61) decreased monotonically at a step of 1/100 in the propagating direction and be eventually closed at the end portion. For example, the waveguide 60 may be designed such that the gap between the waveguide outer shell 62 and the transmissive interface 61 decreases to 1.5 mm, 1.0 mm and 0.5 mm, respectively, at 50 mm, 100 mm and 150 mm away from the opening 63.

Next, the sensor portion 2 will be described. As shown in FIG. 6, as the ultrasonic wave propagates into the waveguide 60, each portion of the ultrasonic wave 5 is transmitted into the propagation medium portion 3 through the transmissive interface 61 and then converged toward the convergence point. As a result, ultrasonic waves come from various directions toward the same convergence point 33. For that reason, as the sensor portion 2 to receive those ultrasonic waves, a device with a curved ultrasonic wave receiving surface is preferably used so as to exhibit a uniform wave receiving characteristic in response to those ultrasonic waves coming from various angles on the YZ plane. In this preferred embodiment, a cylindrical piezoelectric body 21 such as that shown in FIG. 8 is used as such a sensor portion 2.

Figure 8:
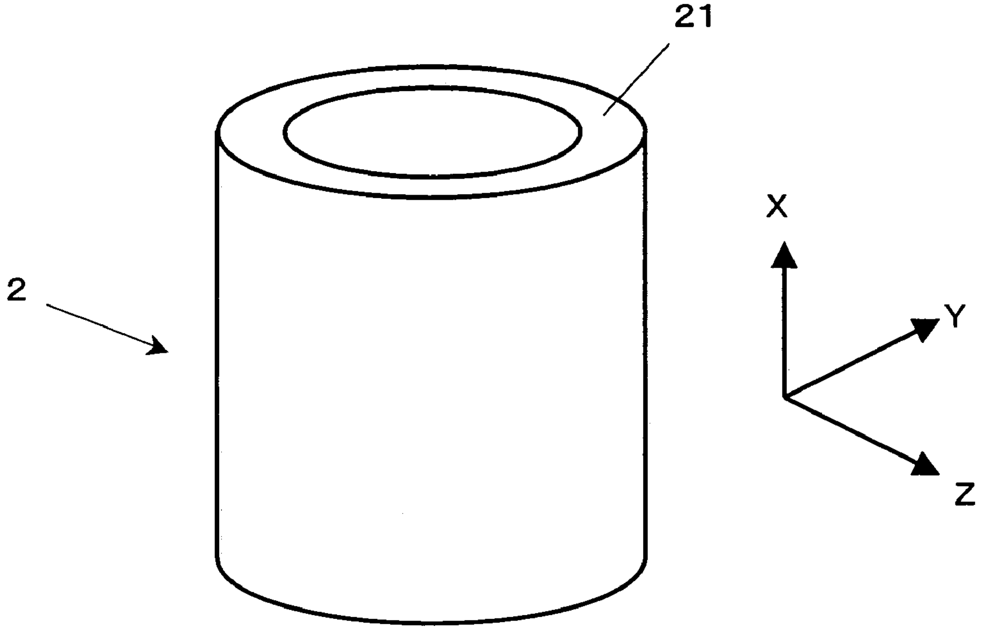
FIGS. 8(*a*) and 8(*b*) are respectively a perspective view and a cross-sectional view of the sensor portion of the ultrasonic receiver shown in FIG. 1.
Figure 8:
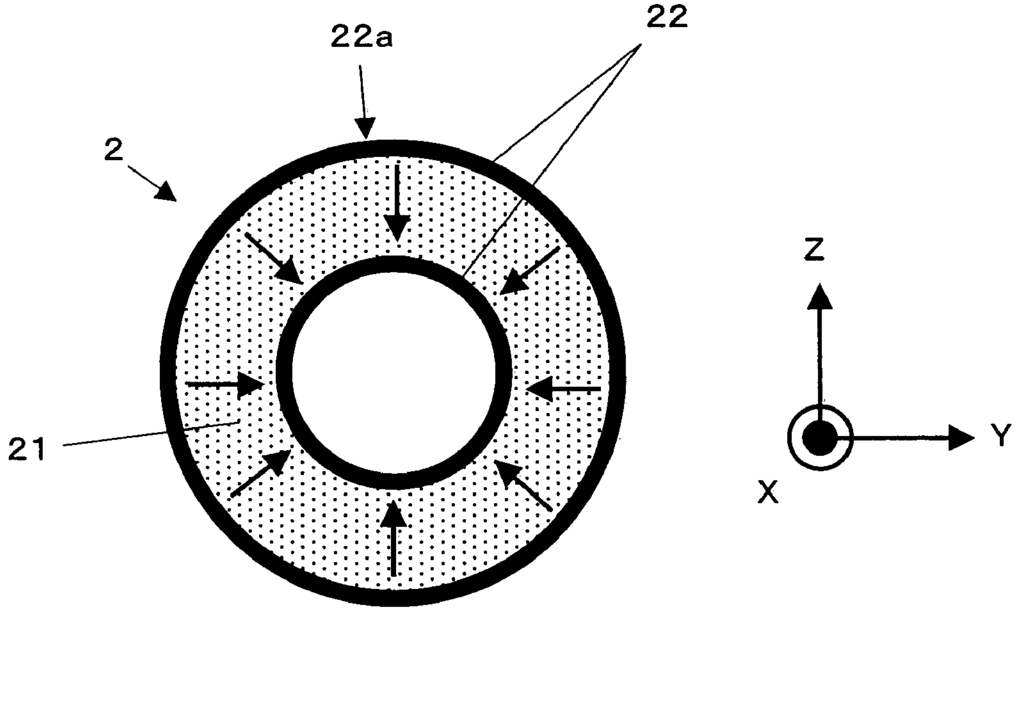

Specifically, FIG. 8(*a*) is a perspective view of the sensor portion 2 and FIG. 8(*b*) is a cross-sectional view of the sensor portion 2 as viewed on a plane that is parallel to the YZ plane. As shown in FIG. 8(*b*), the sensor portion 2 includes a cylindrical piezoelectric body 21 and electrodes 22 that are arranged on the inner and outer surfaces of the piezoelectric body 21: As indicated by the arrows, the piezoelectric body 21 is subjected to a polarization treatment radially (i.e., in the direction in which the outside electrode faces the inside electrode). As shown in FIG. 8(*b*), the outer surface of the sensor portion 2 is a curved surface 22*a*.

When the ultrasonic wave 5 reaches the sensor portion 2, strain is produced in the piezoelectric body 21, and a voltage representing that strain is generated between the two electrodes 22 that face each other. By monitoring an electrical signal representing this voltage with a receiver that is connected to a signal line (not shown), the ultrasonic wave 5 can be detected.

The sensor portion 2 has a size of 2 mm as measured in the X direction, which is equal to the width of the waveguide 60 in the X direction. Also, the sensor portion 2 has a cylindrical shape with an outside diameter of 1.5 mm and an inside diameter of 0.5 mm. The sensor portion 2 has a predetermined resonant frequency in a mode in which it vibrates in the radial direction thereof. The resonant frequency is determined by the shape of the sensor portion 2, specifically, the outside and inside diameters of the cylinder and the material property of the piezoelectric ceramic. In this preferred embodiment, the sensor portion 2 is designed so as to have a resonant frequency of 1 MHz.

The resonant frequency of the sensor portion 2 is preferably sufficiently higher than the frequencies of the ultrasonic waves to receive. This is because although high reception sensitivity is achieved in the vicinity of the resonant frequency, the reception sensitivity is not high at the other frequencies and varies significantly according to the frequency, thus making it difficult to get measurements done accurately. By setting the resonant frequency of the sensor portion 2 to be sufficiently higher than the frequencies of the ultrasonic waves to receive, ultrasonic waves, of which the frequencies fall within a broad range, can be detected.

The material of the piezoelectric body for use to make the sensor portion 2 is not particularly limited but any known material may be used. The piezoelectric body is made of a material with piezoelectricity. The higher the piezoelectricity, the more efficiently the ultrasonic waves can be transmitted and received and the better. Examples of preferred materials for the piezoelectric body include piezoelectric ceramics, piezoelectric single crystals and piezoelectric polymers.

In this preferred embodiment, a lead zirconate titanate ceramic, which is a piezoelectric ceramic with a high degree of piezoelectricity, is used as a material for the piezoelectric body 21. As a material for the electrodes 22, a general metal with low electric impedance may be used. In this preferred embodiment, silver is used as a material for the electrodes 22.

Alternatively, an electrostrictive body of a known material may be used as a material for the sensor portion 2. When such an electrostrictive body is used, the same can be said as in the situation where the piezoelectric body is used. That is to say, the higher the degree of electrostriction caused by the material, the more efficiently the ultrasonic waves can be received and the better.

The present inventors carried out computer simulations to know exactly how the ultrasonic waves, propagating along the waveguide 60 of the ultrasonic receiver 101 with such a configuration, were transmitted into the propagation medium portion 3 and then converged toward the convergence point. The results are shown in FIGS. 9(*a*) through 9(*f*), in which only the waveguide 60 and the propagation medium portion 3 of the ultrasonic receiver 101 are shown to make the locations and phases of the ultrasonic waves easily understandable.

Figure 9:
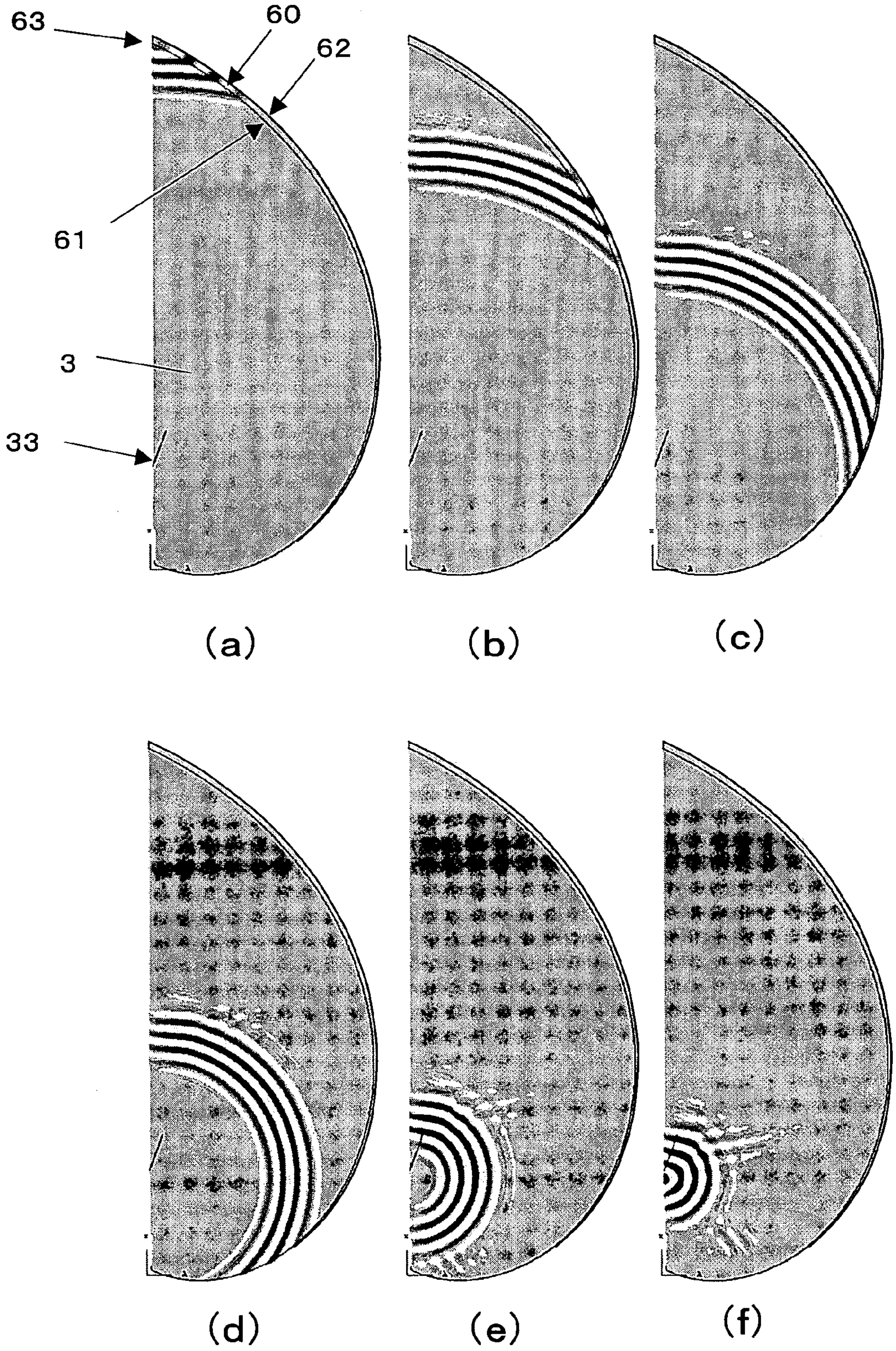
FIGS. 9(*a*) through 9(*f*) show the results of simulations that were carried out to show specifically how the ultrasonic wave would propagate in the ultrasonic receiver shown in FIG. 1.

FIG. 9(*a*) through 9(*f*) show where the ultrasonic waves go with the passage of time. That is to say, FIG. 9(*a*) shows the earliest state, whereas FIG. 9(*f*) shows the latest state. The transmissive interface 61 and the waveguide outer shell 62 that define the waveguide 60 shown in FIGS. 9(*a*) through 9(*f*) are designed such that the ultrasonic waves propagating along the waveguide 60 are eventually converged toward the convergence point 33 in the procedure described above. The opening 63 of the waveguide 60 is located at the top and the closed end portion at the bottom. The waveguide 60 is filled with an environmental fluid 4 (e.g., the air in this example).

Figure 10:
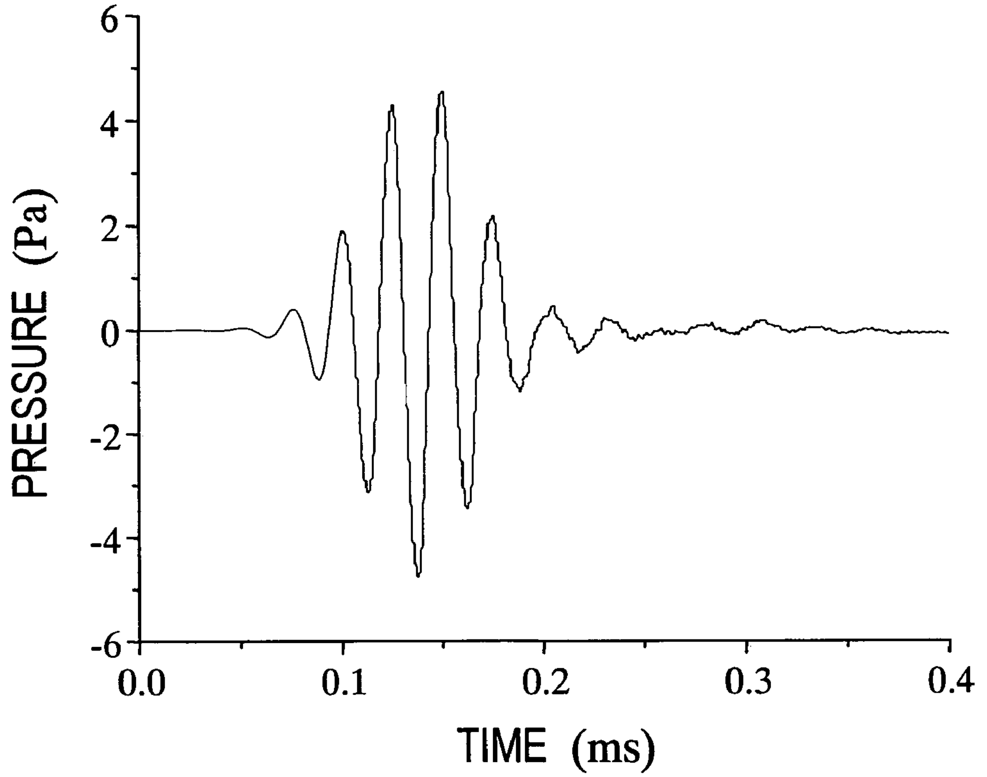
FIG. 10 shows the waveform of the ultrasonic wave that was used in the simulations shown in FIG. 9.

FIG. 10 shows the waveform of the ultrasonic waves that are supposed to come through the opening 63. The center frequency of the ultrasonic waves is approximately 40 kHz and these ultrasonic waves are approximately five times as long as the one wavelength. In FIG. 9(*a*) through 9(*f*), the sound pressure levels of the ultrasonic waves propagating inside the propagation medium portion 3 and the waveguide 60 are represented by gradations. Specifically, portions in deep colors represent sound pressures that are higher than the atmospheric pressure, while portions in light colors represent sound pressures that are lower than the atmospheric pressure. And the distance between two portions in the same color (e.g., two black portions or two white portions) is 40 kHz, which corresponds to one wavelength of the ultrasonic wave. In FIGS. 9(*a*) through 9(*f*), the waveguide is too narrow to confirm it easily. But as the air has an acoustic velocity of 340 m/s inside the waveguide 60, the distance between two portions in the same color (i.e., the distance corresponding to one wavelength) becomes approximately 8.5 mm. In the propagation medium portion 3 on the other hand, the dry gel that is the material of the propagation medium portion 3 has an acoustic velocity of 150 m/s, and therefore, the distance between two portions in the same color (i.e., the distance corresponding to one wavelength) becomes approximately 3.75 mm.

FIG. 9(*a*) shows an instant when a peak of the fourth ultrasonic wave, which has come through the opening 63, enters the waveguide 60 after three ultrasonic waves have come through the opening 63 and propagated inside the waveguide 60. Those three ultrasonic waves that have propagated inside the waveguide 60 are transmitted into the propagation medium portion 3 through the transmissive interface 61 that is in contact with the waveguide 60. Those portions that are shown by gradations inside the propagation medium portion 3 represent the ultrasonic waves that have been refracted and transmitted into the propagation medium portion 3 through the transmissive interface 61.

FIG. 9(*b*) shows what's happening inside the ultrasonic receiver when some amount of time has passed since the receiver was in the state shown in FIG. 9(*a*). Inside the waveguide 60, the ultrasonic waves have propagated so as to trace the shape of the waveguide 60. Also, as shown in FIG. 9(*b*), those ultrasonic waves propagating inside the waveguide 60 are refracted and transmitted into, and traveling inside, the propagation medium portion 3 one wave after another. As shown in FIGS. 9(*a*) and 9(*b*), the ultrasonic waves shown in gradations of black and white have gone longer distances from the opening 63 inside the waveguide 60 rather than inside the propagation medium portion 3. This also shows that the acoustic velocity of the air that is the environmental fluid 4 in the waveguide 60 is higher than that of the dry gel as the propagation medium.

FIG. 9(*c*) also shows how the ultrasonic waves, propagating inside the waveguide 60, are refracted and transmitted into, and traveling inside, the propagation medium portion 3 one wave after another. As those ultrasonic waves are refracted and transmitted, the pattern of black and white gradations is folded on the transmissive interface 61. Inside the propagation medium portion 3, however, the pattern of the black and white gradations is going to draw a beautiful curve, which means that the ultrasonic waves propagating inside the propagation medium portion 3 have matching phases.

FIG. 9(*d*) shows how some ultrasonic waves are propagating near the end of the waveguide 60, while others are gradually converged toward the convergence point 33 inside the propagation medium portion 33.

FIG. 9(*e*) shows what will happen inside the ultrasonic receiver when the ultrasonic waves reach even deeper inside the waveguide. As shown in FIG. 9(*e*), in this state, every ultrasonic wave has already reached the end of the waveguide and has been refracted and transmitted into the propagation medium portion 3. And those ultrasonic waves traveling inside the propagation medium portion 3 are now going to be converged toward the convergence point 33.

FIG. 9(*f*) shows that the first one of the ultrasonic waves that has traveled inside the propagation medium portion earlier than any other ultrasonic wave has reached the convergence point 33. As shown in FIG. 9(*f*), the black portions are even deeper now, which means that the ultrasonic waves have been converged toward the convergence point 33 and that the sound pressure has been increased.

No specific numerical values are shown in FIGS. 9(*a*) through 9(*f*). However, the present inventors discovered and confirmed via experiments that if the ultrasonic waves changed the sound pressure by about 4 Pa from the atmospheric pressure inside the waveguide 60, the sound pressure varied by about 34 Pa from the atmospheric pressure in the vicinity of the convergence point 33. This means that the sound pressure of the ultrasonic waves was increased more than eightfold. Thus, we confirmed that ultrasonic waves in an environmental fluid could be monitored with high sensitivity according to this preferred embodiment.

As described above, according to this preferred embodiment, by refracting an incoming ultrasonic wave such that the ultrasonic wave goes through an environmental fluid and then is transmitted into a propagation medium portion, the ultrasonic wave can be transmitted through the propagation medium with high efficiency while the reflection of the ultrasonic wave from an interface between two media with mutually different acoustic impedances is minimized. Also, the propagation medium portion is preferably arranged so as to define one surface of the waveguide that is filled with an environmental fluid. And the surface shape of the propagation medium portion in contact with the waveguide is preferably determined such that as the ultrasonic wave propagates inside the waveguide, each portion of the ultrasonic wave is transmitted into the propagation medium portion and then converged toward a predetermined convergence point. Then the ultrasonic wave that has been transmitted one wave after another into the propagation medium portion can be converged toward the convergence point with their phases matched with each other. As a result, the ultrasonic wave can be converged by using the majority of the ultrasonic wave that has come through the opening of the waveguide, and the sound pressure of the ultrasonic wave received can be increased. Consequently, the ultrasonic wave can be detected with high sensitivity.

In addition, if an ultrasonic vibrator that has a curved receiving surface is used to detect the ultrasonic waves, the ultrasonic waves that have come from various directions and are now converging toward a single point can be detected in the correct waveform. As a result, the information that is superposed on the waveform of the ultrasonic waves to propagate can be detected properly.

Figure 11:
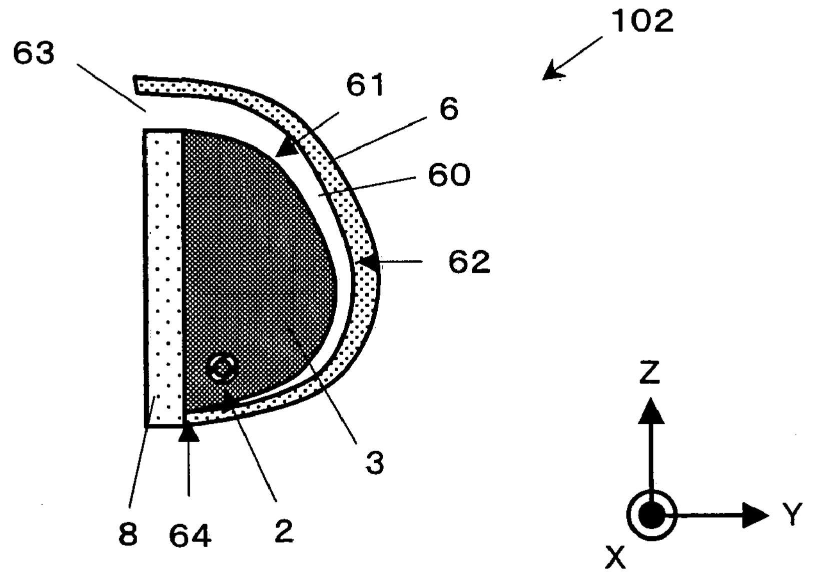
FIG. 11 is a cross-sectional view illustrating another specific example of an ultrasonic receiver according to the present invention.

The ultrasonic receiver 101 of the preferred embodiment described above includes the converging portion 7. However, the converging portion 7 may be omitted. For example, the ultrasonic receiver 102 shown in FIG. 11 includes the wave propagating portion 6, the propagation medium portion 3, the sensor portion 2, and the holding portion 8 to hold the propagation medium portion 3 but does not include any converging portion 7. If an ultrasonic wave propagating through an environmental fluid has strong directivity and if the sound pressure is relatively high, then there is no need to converge an ultrasonic wave propagating through a wide area before monitoring it. This ultrasonic receiver 102 is preferably adopted in such a situation. With no converging portion 7, the ultrasonic receiver 102 can have a smaller overall size.

Also, in the ultrasonic receiver 101 of the preferred embodiment described above, the end of the waveguide is closed. However, the end may be opened, too. For example, in the alternative ultrasonic receiver 103 shown in FIG. 12, the end 64 of the waveguide 60 is opened. If the ultrasonic wave propagating along the waveguide 60 has relatively high energy and if there is no need to use all of that energy, that excessive part of the ultrasonic wave that has propagated through the waveguide 60 but has not been transmitted into the propagation medium portion 3 is preferably removed so as not to be reflected from the end portion and affect the operation of the receiver. The ultrasonic receiver 103 has the waveguide 60 with an open end 64, and can remove that excessive ultrasonic wave that has not been transmitted into the propagation medium portion 3. As a result, the target ultrasonic wave can be detected accurately while preventing the received ultrasonic wave from being disturbed. In that case, the waveguide 60 may be shorter than the preferred length that is defined as described above according to the size of the opening.

Optionally, an acoustic impedance transducer portion may be simply provided at the end of the waveguide. The ultrasonic receiver 104 shown in FIG. 13 includes an acoustic impedance transducer portion 17 at the end 64 of the waveguide 60. The acoustic impedance transducer portion 17 may have the same shape as the converging section 7, for example, and has a cross-sectional area that increases in the propagating direction of an ultrasonic wave that goes outward from the end 64 of the waveguide 60.

Figure 12:
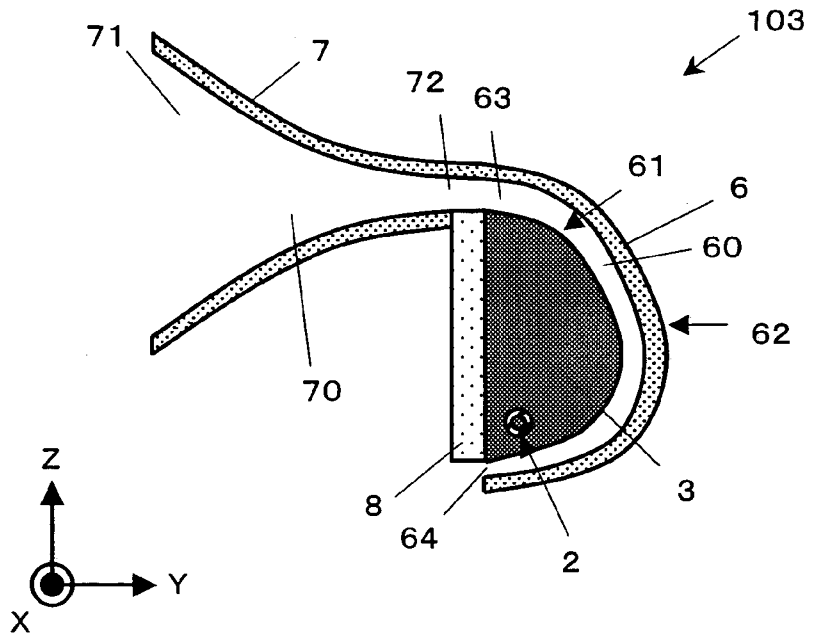
FIG. 12 is a cross-sectional view illustrating still another specific example of an ultrasonic receiver according to the present invention.
Figure 13:
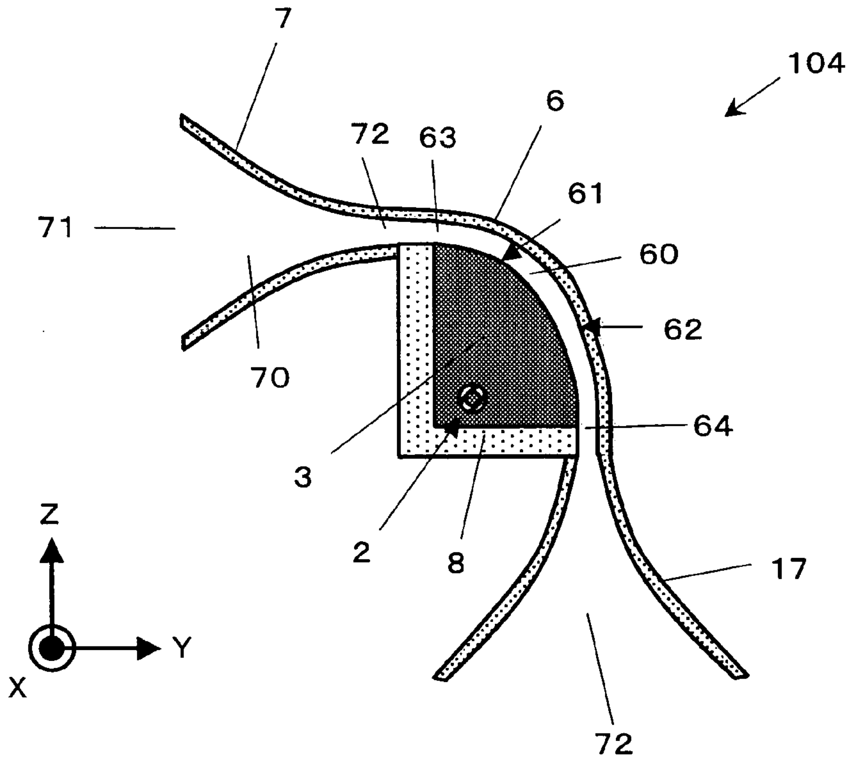
FIG. 13 is a cross-sectional view illustrating yet another specific example of an ultrasonic receiver according to the present invention.
Figure 14:
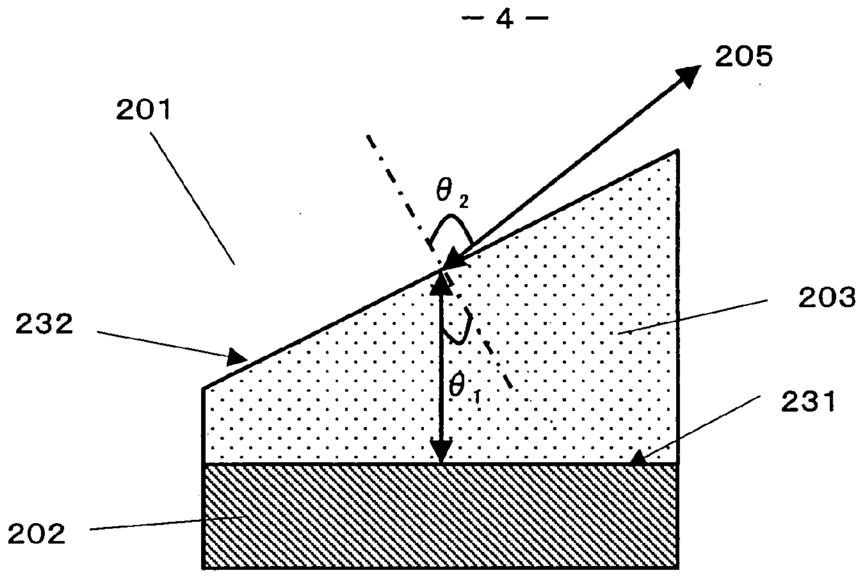
FIG. 14 is a schematic representation illustrating the structure of a conventional ultrasonic receiver that is designed to refract and detect an incoming ultrasonic wave.

If the end 64 of the waveguide 60 is opened as shown in FIG. 12, the environmental fluid is continuous inside and outside of the waveguide 60. However, as the space expands abruptly, the acoustic impedance changes steeply. As a result, the ultrasonic wave could be reflected from the open end 64 due to acoustic impedance mismatching and the reflected ultrasonic wave could affect the waveform of the ultrasonic wave propagating along the waveguide 60. In that case, the acoustic impedance transducer portion 17 is preferably arranged at the end of the waveguide 60 as shown in FIG. 13, thereby gradually changing the acoustic impedances at the end 64 of the waveguide 60. In this manner, the reflection of the ultrasonic wave from the end 64 of the waveguide 60 can be further reduced and the target ultrasonic wave can be detected just as intended without disturbing the ultrasonic wave received.

INDUSTRIAL APPLICABILITY

The ultrasonic receiver of the present invention can be used effectively as an ultrasonic receiver, an ultrasonic transducer or an ultrasonic sensor to receive and detect ultrasonic waves in various fields of applications. The present invention is particularly effectively applicable to an ultrasonic receiver, an ultrasonic transducer or an ultrasonic sensor that should receive and detect ultrasonic waves with high sensitivity.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

The invention claimed is:

1. An ultrasonic receiver comprising:

a wave propagating portion, which defines a first opening and a waveguide that makes an ultrasonic wave, coming through the first opening, propagate in a predetermined direction;

a propagation medium portion, which has a transmissive interface and which is arranged with respect to the waveguide such that the transmissive interface defines one surface of the waveguide in the direction in which the ultrasonic wave propagates, the transmissive interface being designed and arranged with respect to the waveguide such that as the ultrasonic wave propagates along the waveguide, each portion of the ultrasonic wave is transmitted into the propagation medium portion through the transmissive interface and then converged toward a predetermined convergence point; and a sensor portion, which is arranged at the convergence point to detect the ultrasonic wave converged, wherein the propagation medium portion includes a propagation medium that fills a space between the transmissive interface and the convergence point, and wherein the waveguide is filled with an environmental fluid and acoustic velocities $C_n$ and $C_a$ of the ultrasonic wave propagating through the propagation medium and the environmental fluid, respectively, satisfy $$\frac{C_n}{C_a} < 1$$

and wherein if a distance from the first opening of the waveguide to a point P, which is set at an arbitrary location on the transmissive interface, is $L_a$ as measured in the ultrasonic wave propagating direction and if a distance from the point P to the convergence point is $L_n$, then $L_a/C_a+L_n/C_n$ is always constant irrespective of where the point P is located.

2. The ultrasonic receiver of claim 1, wherein the transmissive interface is curved.

3. The ultrasonic receiver of claim 2, wherein the densities $\rho_n$ and $\rho_a$ of the propagation medium and the environmental fluid satisfy $$\frac{\rho_a}{\rho_n} < \frac{C_n}{C_a} < 1.$$

4. The ultrasonic receiver of claim 3, wherein the sensor portion includes an ultrasonic vibrator with a curved receiving surface.

5. The ultrasonic receiver of claim 4, wherein the width of the waveguide is a half or less of the wavelength of the ultrasonic wave.

6. The ultrasonic receiver of claim 5, wherein as viewed on planes that are defined perpendicularly to the ultrasonic wave propagating direction, the waveguide has cross-sectional areas that decrease in the ultrasonic wave propagating direction.

7. The ultrasonic receiver of claim 6, wherein the waveguide has an open end.

8. The ultrasonic receiver of claim 7, further comprising an acoustic impedance transducer portion that has gradually varying acoustic impedances and that is arranged at the end of the waveguide.

9. The ultrasonic receiver of claim 6, wherein the propagation medium is a dry gel made of an inorganic oxide or an organic polymer.

10. The ultrasonic receiver of claim 9, wherein the dry gel has a hydrophobized solid skeleton.

11. The ultrasonic receiver of claim 10, wherein the dry gel has a density of 100 $kg/m^3$ or more and an acoustic velocity of 300 m/s or less.

12. The ultrasonic receiver of claim 11, wherein the environmental fluid is the air.

13. The ultrasonic receiver of claim 6, further comprising a converging portion that defines a second opening bigger than the first opening of the waveguide, the converging portion converging the ultrasonic wave that has come through the second opening, thereby increasing sound pressure and making the ultrasonic wave reach the first opening of the waveguide.

14. An ultrasonic receiver comprising:

a wave propagating portion, which has a first opening and which allows an ultrasonic wave, coming through the first opening, to propagate inside;

a propagation medium portion, which has a transmissive interface and which is arranged with respect to the wave propagating portion such that the transmissive interface defines one surface of the wave propagating portion in the direction in which the ultrasonic wave propagates, the transmissive interface being designed and arranged with respect to the wave propagating portion such that as the ultrasonic wave propagates inside the wave propagating portion, each portion of the ultrasonic wave is transmitted into the propagation medium portion through the transmissive interface and then converged toward a predetermined convergence point; and a sensor portion, which is arranged at the convergence point to detect the ultrasonic wave converged, wherein supposing the acoustic velocities of the ultrasonic wave propagating through the propagation medium portion and the wave propagating portion are $C_n$ and $C_a$, respectively, a distance from the first opening of the waveguide to a point P, which is set at an arbitrary location on the transmissive interface, is $L_a$ as measured in the ultrasonic wave propagating direction and a distance from the point P to the convergence point is $L_n$, $L_a/C_a+L_n/C_n$ is always constant irrespective of where the point P is located.

* * * * *